United States Patent [19]

Dinter et al.

[11] 4,426,344

[45] Jan. 17, 1984

[54] COEXTRUSION PROCESS AND APPARATUS FOR MANUFACTURING MULTI-LAYERED FLAT FILMS OF THERMOPLASTIC MATERIALS

[75] Inventors: Peter Dinter, Hallgarten; Andreas Kolbe, Wiesbaden, both of Fed. Rep. of Germany

[73] Assignee: Hoechst Aktiengesellschaft, Frankfurt am Main, Fed. Rep. of Germany

[21] Appl. No.: 280,334

[22] Filed: Jul. 6, 1981

[30] Foreign Application Priority Data

Jul. 5, 1980 [DE] Fed. Rep. of Germany ....... 3025564

[51] Int. Cl.³ .................................................. B29F 3/04
[52] U.S. Cl. .............................. 264/171; 264/177 R; 264/210.1; 425/131.1; 425/133.5; 425/462
[58] Field of Search .................. 264/171, 210.2, 210.1, 264/177 R, 173; 425/133.5, 131.1, 462

[56] References Cited

U.S. PATENT DOCUMENTS

| | | | |
|---|---|---|---|
| 1,356,891 | 10/1920 | Steinle . | |
| 3,321,804 | 5/1967 | Breidt, Jr. et al. | 425/133.5 |
| 3,443,277 | 5/1969 | Frielingsdorf | 264/171 |
| 3,444,031 | 5/1969 | Schrenk | 264/1.6 |
| 3,485,912 | 12/1969 | Schrenk et al. | 264/171 |
| 3,487,505 | 1/1970 | Chisholm et al. | 425/133.5 |
| 3,524,795 | 8/1970 | Peterson | 264/171 |
| 3,694,119 | 9/1972 | Scheibling | 425/133.5 |
| 3,759,647 | 9/1973 | Schrenk | 425/133.5 |
| 3,847,585 | 11/1974 | Chisholm | 264/171 |
| 3,884,606 | 5/1975 | Schrenk | 425/133.5 |

FOREIGN PATENT DOCUMENTS

| | | |
|---|---|---|
| 672832 | 5/1966 | Belgium . |
| 1479111 | 5/1969 | Fed. Rep. of Germany . |
| 1407515 | 9/1969 | Fed. Rep. of Germany . |
| 1948442 | 4/1971 | Fed. Rep. of Germany ...... 264/171 |
| 2123331 | 11/1971 | Fed. Rep. of Germany ...... 264/171 |
| 1088928 | 3/1955 | France . |
| 2167453 | 1/1972 | France . |
| 50-30677 | 10/1975 | Japan ................................. 425/131.1 |
| 53-102964 | 9/1978 | Japan ................................. 264/171 |
| 1392291 | 4/1975 | United Kingdom ................ 264/173 |

OTHER PUBLICATIONS

*Kunststoffe*, vol. 69, No. 2 (1979), pp. 81 and 82.

*Primary Examiner*—Jeffery R. Thurlow
*Attorney, Agent, or Firm*—Schwartz, Jeffery, Schwaab, Mack, Blumenthal & Koch

[57] ABSTRACT

Disclosed is a process for producing a multiple-layered sheet of film comprising at least two thermoplastic materials by coextrusion through a slot die, comprising the steps of heat plastifying a first, second, third and fourth thermoplastic material; joining a stream of the first heat plastified thermoplastic material and a stream of the second heat plastified thermoplastic material to form a first combined stream having a generally rectangular cross-section and having an upper layer of the first thermoplastic material and a lower layer of the second thermoplastic material mechnically anchored together by means of profiles formed on the contact surfaces of the two layers; joining a stream of the third heat plastified thermoplastic material and a stream of the fourth heat plastified thermoplastic material to form a similar second combined stream, reducing the width of the first and second combined stream; joining the first and second combined streams in edge-to-edge fashion in a single plane to form a composite stream; introducing the composite stream into the inlet channel of the slot die; coextruding the composite stream through the slot die to form a multiple layer film or sheet; and cooling the film or sheet. Also disclosed is an apparatus for carrying out this process.

17 Claims, 7 Drawing Figures

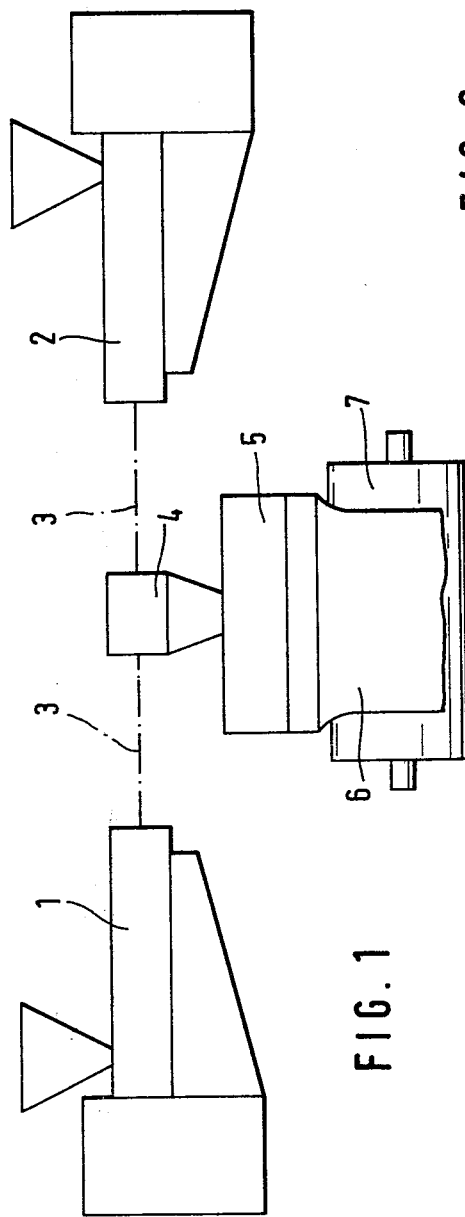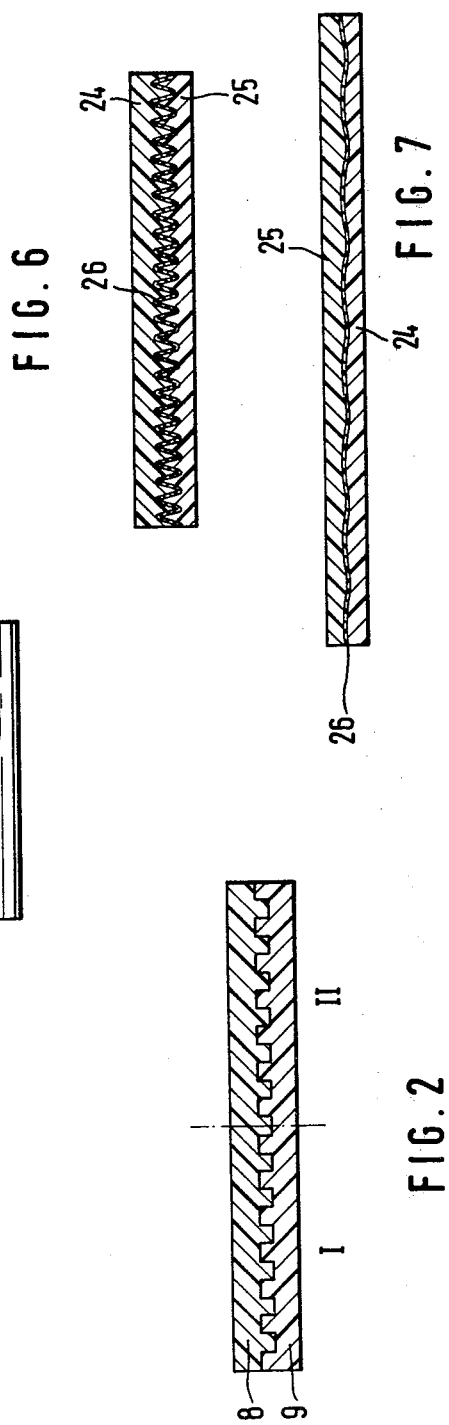

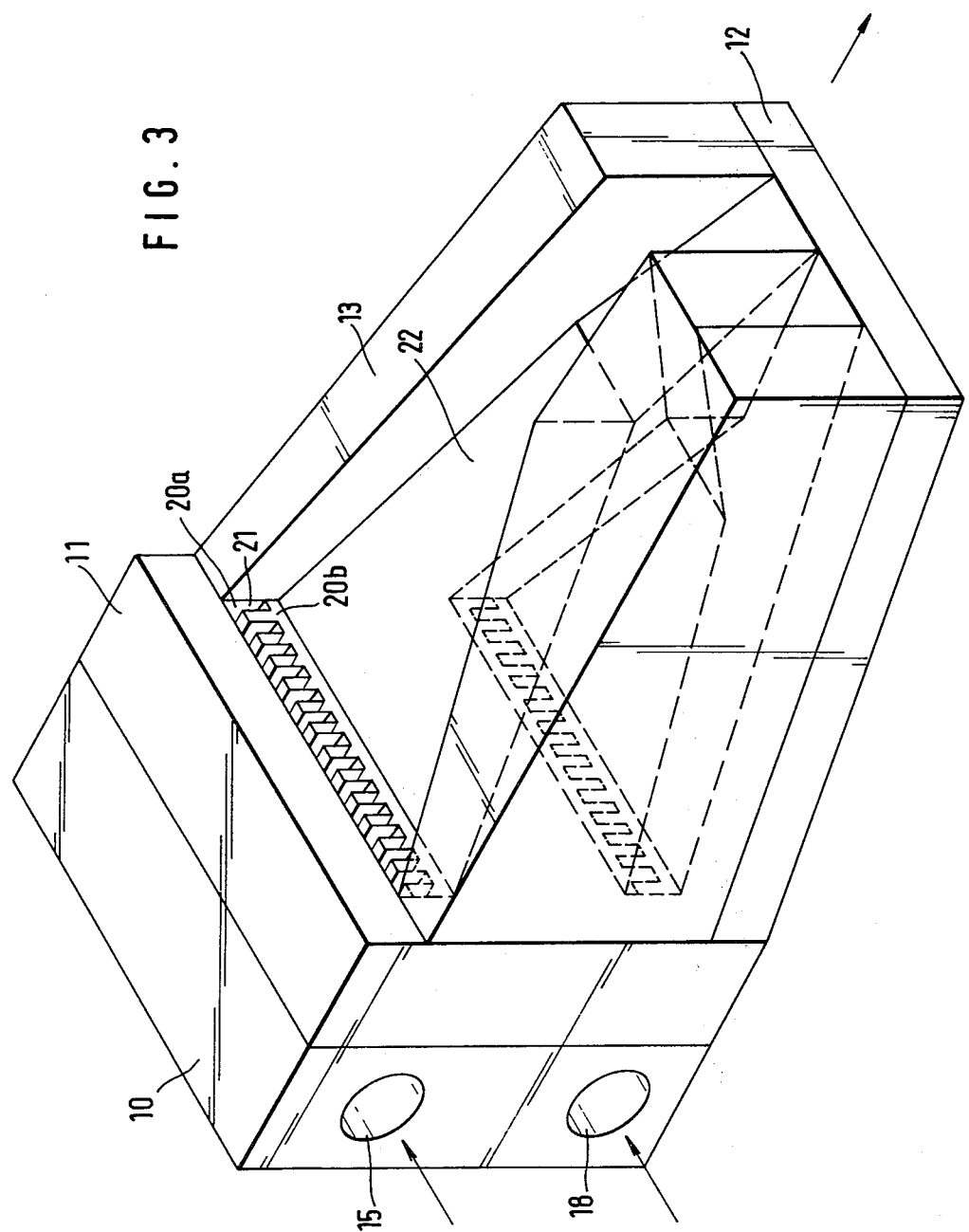

COEXTRUSION PROCESS AND APPARATUS FOR MANUFACTURING MULTI-LAYERED FLAT FILMS OF THERMOPLASTIC MATERIALS

BACKGROUND OF THE INVENTION

The present invention relates to a coextrusion process for the manufacture of composite flat films or sheets comprising at least two layers of different base materials which are heat plastified in extruders and then united in a specially designed adapter means to form one melt stream or strand. In its broader aspects, this invention also relates to the manufacture of stretched composite films. The present invention further relates to an apparatus for carrying out this process by means of a specially designed adapter.

Composite or multi-layered films of thermoplastic materials are manufactured in order to take advantage in one product of the advantageous properties of different plastic materials. In addition to conventional process methods which have been used for a number of years, such as, e.g., bonding, laminating and extrusion coating, the process of coextrusion has gained more and more importance in recent times.

As far as the practical application of coextrusion is concerned, a number of different criteria have to be taken into account, including not only those which relate to the process itself, but also those relating to basic problems, e.g., the problem of adhesion.

The latter phenomenon is of practically no importance or of only minor importance in those cases where materials of an identical or of similar nature are employed, e.g., polyethylene and polypropylene. If thermoplastic materials of different types are to be coextruded, however, it is almost impossible to avoid the use of adhesion promoters or of special adhesion-improving processes, e.g., corona or gas treatment. No doubt, the film production process is made technically more complicated and thus ultimately more expensive by these process steps. Therefore, attempts have been made to increase the bonding strengths of coextruded products by mechanically linking their surfaces with each other, in addition to the normal physico-chemical adhesion mechanisms. The technical realization of such attempts is based on the idea of shaping the layer surfaces to be linked with each other such that a zipper-like meshing would be obtained.

A process of this kind has been described in "Kunststoffe", Vol. 69, No. 2 (1979), pages 81 and 82. Therein, a multi-layered film tubing is produced by means of a special ring die being composed of a fixed outer die body and rotating, profiled die lips. A spirally wound toothing of the individual layers results from this combination. A disadvantage of this process is, however, that a complicated and thus expensive special die is required which cannot be used for any other purposes. Even simple measures belonging to everyday production routine, such as the changeover of the production program to greater film widths or an exchange of the die for qualitative reasons due a contamination of the old die, require the disposition of a further special die, which is technically complicated and thus leads to higher operating expenses.

Another disadvantage of this process is represented by the limited number of toothed configurations. Since the adhesiveness of the composite film is largely determined by these toothed configurations, as great a number of them as possible is desired. The circumferential slot length of the ring dies which from time-to-time become available and the technological possibilities of providing the die lips with toothed configurations, automatically set limits to an unlimited multiplication of the toothed configurations.

Most of the objections made against the above process also apply to the extruder head described in German Auslegeschrift No. 21 23 331 and to the process according to U.S. Pat. No. 3,444,031. Apart from some minor apparatus variations, here, too, the manufacture of multi-layered, mechanically anchored flat films is described. In both cases, specially designed slot dies are used. The toothed profile which is to be obtained on the finished composite film is predetermined by distributor elements inserted into the die body.

The mechanical anchoring of coextruded polymer layers is, inter alia, also described in German Auslegeschrift No. 19 48 442. For manufacturing multilayered flat films, there is used in this process an adapter means having a circular cross-section which is attached directly before the slot die and by means of which the melt streams are united. In a special embodiment, the lip of the adapter means where the melt streams meet can be toothed. From the two-layered polymer stream which has been united in this profiled form, a flat film is formed in the directly subsequent slot die. Here the disadvantage quite obviously lies in the incongruity between the sizes of the adapter means and the slot die. If one assumes sizes of the die inlet channels of between 20 and 30 mm, as they are conventionally used today, and compares them with the working widths of the usually employed slot dies of about 1,500 mm, it becomes obvious that the density of toothings which can be achieved at the adapter lip, the size of which corresponds to that of the die inlet channel, will hardly be sufficient to increase the adhesiveness of the finished flat film. Moreover, some of these few toothings get lost, since they lie within the bent edge areas which are lost when the edges are trimmed off.

In this connection, still another disadvantage of the above-described adapter means becomes apparent, namely, the circular shape of the melt channel. This shape has a very unfavorable influence on the uniformity of the thickness of the individual layers and of the final composite films. The more forming processes the melt layers have to undergo, the greater is the danger of undesired profile deteriorations of the finished product.

SUMMARY OF THE INVENTION

It is therefore an object of the present invention to provide an improved process for the coextrusion of films or sheets.

Another object of the invention resides in the provision of a process for coextruding films having an improved composite adhesiveness, by using an adapter means wherein the disadvantages of the known processes are avoided.

It is also an object of the present invention to provide an improved apparatus for use in carrying out the process according to the invention.

In accomplishing the foregoing objects, there has been provided in accordance with one aspect of the present invention a process for producing a multiple-layered sheet of film comprising at least two thermoplastic materials by coextrusion through a slot die, comprising the steps of heat plastifying a first, second, third and fourth thermoplastic material; joining a stream of the first heat plastified thermoplastic material and a stream of the second heat plastified thermoplastic material to form a first combined stream having a generally rectangular cross-section and having an upper layer of the first thermoplastic material and a lower layer of the second thermoplastic material mechanically anchored together by means of profiles formed on the contact surfaces of the two layers, the width of the first combined stream being greater than one-half of the width of the inlet channel of the slot die; joining a stream of the third heat plastified thermoplastic material and a stream of the fourth heat plastified thermoplastic material to form a second combined stream having a generally rectangular cross-section and having an upper layer of the third thermoplastic material and a lower layer of the fourth thermoplastic material mechanically anchored together by means of profiles formed on the contact surfaces of the two layers, the width of the second combined stream being greater than one-half of the width of the inlet channel of the slot die; reducing the width of the first and second combined streams; joining the first and second combined streams in edge-to-edge fashion in a single plane to form a composite stream; introducing the composite stream into the inlet channel of the slot die; coextruding the composite stream through the slot die to form a multiple layer film or sheet; and cooling the film or sheet. In one preferred embodiment, the first and second combined streams are formed in separate planes lying one above the other and the width of each is greater than the width of the inlet channel of the slot die. In another preferred embodiment, the process comprises simultaneously reducing the width of the first and second composite streams and joining them to form the composite stream. Most preferably, the first and second combined streams are reduced in width to a width which is sufficient to provide, in the joining step, a composite stream having a width approximately equal to the width of the inlet channel of the slot die. Advantageously, the process further comprises the step of stretching the cooled film or sheet.

In another embodiment, the first and third thermoplastic materials are the same and said second and fourth thermoplastic materials are the same, whereby the layer build-up of the first and second combined streams is the same. Alternatively, the layer build-up of the first and second combined streams may be different.

In still another embodiment, the process includes the steps of heat plastifying a fifth and sixth thermoplastic material; interposing a layer of the fifth thermoplastic material between the upper and lower layers when forming the first combined stream; and interposing a layer of the sixth thermoplastic material between the upper and lower layers when forming the second combined stream. This is preferably carried out when the stretchability of the fifth and sixth thermoplastic materials is less than the stretchability of the first, second, third and fourth thermoplastic materials.

In accordance with another aspect of the present invention, there has been provided an adapter apparatus for use in carrying out the above-described process, comprising an inlet member having inlet channels for the first, second, third and fourth heat plastified thermoplastic materials; an intermediate member adjacent to the inlet member, having first and second generally rectangular combined-stream-forming chambers positioned one above the other, a profiled partition wall in each of the chambers dividing each chamber into first and second sub-chambers and passageways connecting each of the sub-chambers with one of the inlet channels; a transition piece adjacent to the intermediate member, having first and second channels therein, with the first channel extending from the first combined-stream-forming chamber, having a convergent width and a diverging height and terminating in an outlet end, and with the second channel extending from the second combined-stream-forming chamber, having a convergent width and a diverging height and terminating in an outlet end positioned side-by-side with the outlet end of the first channel; and a die flange connected to the transition piece for attachment of a slot extrusion die, wherein the die flange has an aperture therein corresponding in size and shape to the inlet channel of the slot die and being positioned for communication with the outlet ends of the channels in the transition piece.

Further objects, features and advantages of the present invention will become apparent from the detailed description of preferred embodiments which follows, when considered together with the attached figures of drawing.

BRIEF DESCRIPTION OF THE DRAWINGS

In the drawings:

FIG. 1 is a general schematic view of an apparatus suitable for carrying out the process of the invention;

FIG. 2 is a cross-sectional view of a composite film manufactured by the process according to the present invention;

FIG. 3 is a perspective view of a portion of the coextrusion apparatus according to the present invention (without the die flange), where on one side the cover has been removed in the conical transition piece to better illustrate the interior of the apparatus;

FIG. 6 is a cross-sectional view of a three-layered, unstretched composite film having an ABA structure, obtained according to the invention and composed of a combination of thermoplastic materials having good and poor stretching properties; and FIG. 7 is a cross-sectional view of the film according to FIG. 6 after stretching it in the transverse direction.

DETAILED DESCRIPTION OF PREFERRED EMBODIMENTS

Figure 4:
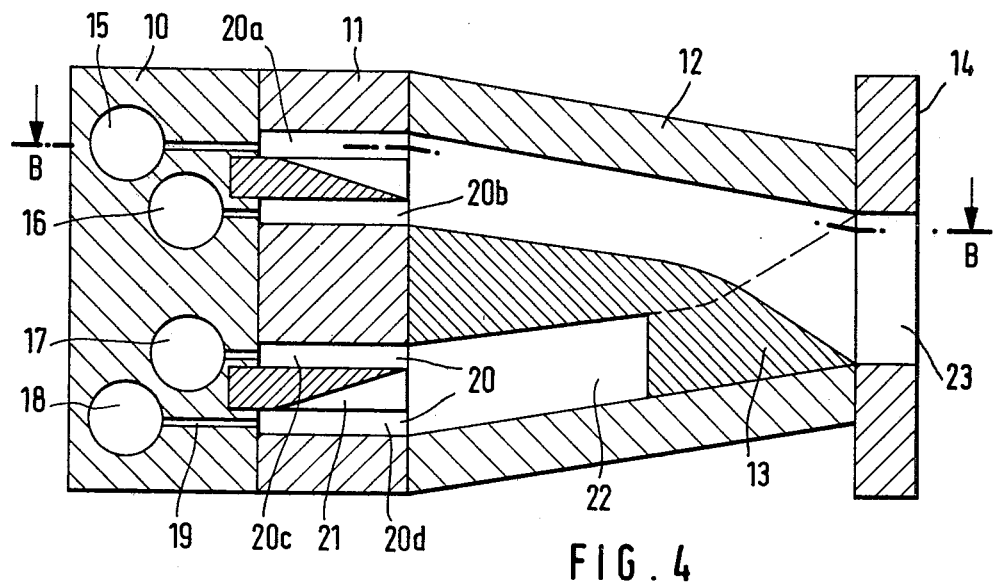
FIG. 4 is a cross-sectional view of the apparatus according to the invention, taken along the line A—A in FIG. 5.

The invention provides a process for the manufacture of a coextruded composite film or sheet comprising at least two thermoplastic materials, wherein the thermoplastic materials are heat plastified and united under pressure in an adapter means to give a melt stream which is mechanically anchored by profiles provided on the contact surfaces. A flat film is subsequently produced by forcing the melt stream through a slot die, and the material is then cooled into a composite film. The process is characterized in that melt streams of plastic material which have been individually, rectangularly formed in several separate planes lying one above the other, and which have a width amounting to a multiple of the width of the inlet channel of the slot die, are united and also in that, by bringing these uniformly layered streams together in a common plane which extends in the direction of the outlet opening of the slot die and simultaneously reducing the width of the individual streams and joining them laterally in this plane, a combined composite stream is formed wherein the layer build-up corresponds to that of the individual streams and the width corresponds to that of the die inlet channel.

In a preferred embodiment, the process is carried out such that the multi-layered melt streams, which have come from different planes and have been united in one common plane, have a different layer build-up.

This process is particularly suitable for the manufacture of composite films which subsequently are stretched in at least one direction, and optionally are subjected to a heat setting treatment. With such composite films, for specific reasons, combinations of plastic materials are employed, wherein the stretchability of one or several of the materials used is different from that of the other materials. In this case, the process is carried out such that the less stretchable polymer(s) is (are) embedded between the layers of the more stretchable polymer(s), preferably in the form of a saw-tooth profile. During the subsequent at least monoaxial, but preferably biaxial stretching process, the stretchability of the more stretchable material is forced onto the less stretchable material, without the layers being separated. Examples of combinations of this type are polyamides—polyethylenes; polypropylene—ehtylene vinyl alcohol copolymers; polyesters (e.g., polyethylene terephthalate)—polyethylenes; and others.

Thus, by employing the process according to the present invention, it is possible to produce stretched composite films comprising materials which normally would tend to delaminate after having been coextruded and subsequently stretched. This is of particular practical importance, as it has become possible to produce special types of composite films having properties which can be exactly predetermined in accordance with the requirements they are to meet.

The present invention further provides an apparatus for carrying out the above-described process. The apparatus is characterized in that in a housing 10, 11, 12, 13, 14 comprising an outlet orifice 23 and several melt-collecting channels 15, 16, 17, 18, where different polymer melts are fed in, there are provided a number of rectangular outlet slots 20 having a width amounting to a multiple of the width of the outlet orifice 23 and being arranged in different planes which are located one above the other. The outlet slots are divided by partition walls 21 into a number of individual profiles 20a, 20b, 20c, 20d which lie one above the other, which on one end are connected with the melt channels 15 to 18, via bores 19, and which on their other end are open toward channels 22. In the direction of the outlet, channels 22 have a convergent width and a divergent height and are embedded into the intermediate piece 13 such that on their outlet end they are aligned side-by-side in one plane and correspond with the outlet orifice 23 of the die flange 14.

In a preferred embodiment, several partition walls 21 are built into the outlet slots 20, and as a result, further toothed configurations can be provided on the layers.

An apparatus, where the partition walls are exchangeable, has proved to be particularly suitable for practical use, since by means of these walls the toothed profiles, and thus the adhesiveness of the layers relative to the plastic materials employed, can be optimized by choosing in each case the most suitable profile.

The partition walls are preferably arranged such that the profiles between them are in the form of slits, sawteeth, wave-lines, dovetails, etc.

The invention is explained in more detail by way of the specific embodiments illustrated in the attached drawing figures. It is understood, however, that the embodiments shown therein are in no sense limiting.

According to FIG. 1, extruders 1 and 2 are provided for the manufacture of toothed, two-layered composite films. Extruders 1 and 2 are linked with the apparatus 4 according to this invention by melt lines 3. The apparatus 4 is directly flanged to a conventional slot die 5. The melt film 6 extruded from the slot die 5 is cooled down to a temperature below its melting temperature on the cooling roll 7. The film which has been solidified in this way may either be wound up as a ready-for-use composite film or, preferably, may be subjected to a known monoaxial or biaxial stretching process.

FIG. 2 illustrates the build-up of a toothed, two-layered (in its simplest embodiment) composite film which can be produced by means of the present invention. Depending on the constructional design of the apparatus 4, the final film is composed of two halves I and II, the layers 8 and 9 of which consist of different thermoplastic materials A and B which have been heat plastified in the extruders 1 and 2.

Figure 5:
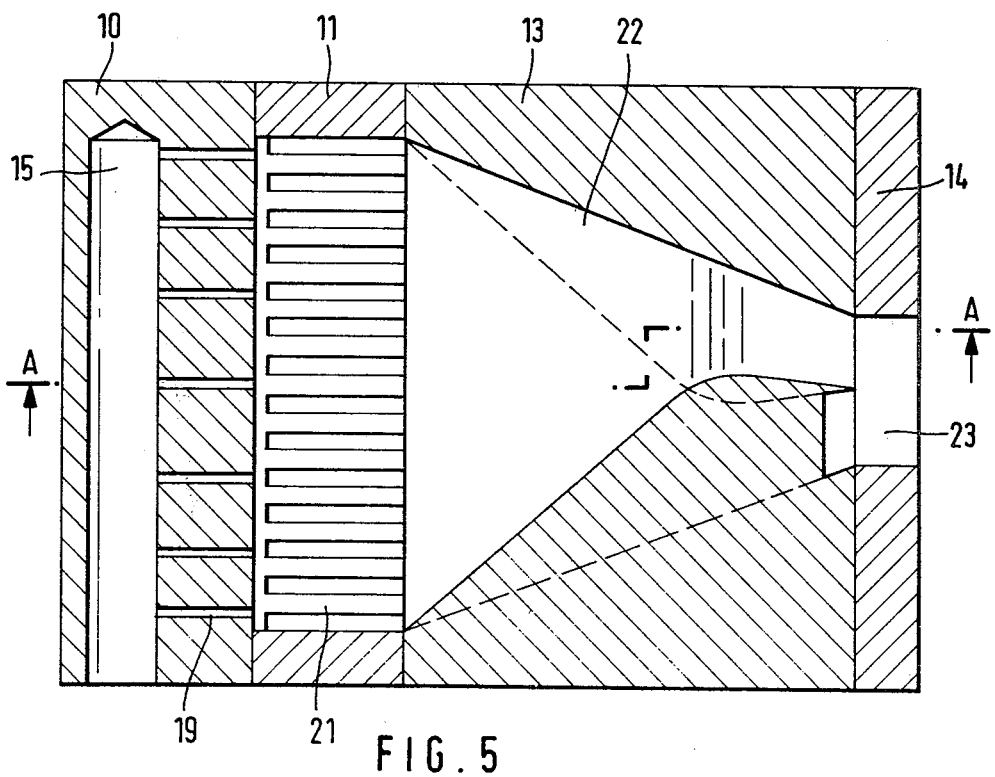
FIG. 5 is a cross-sectional view of the apparatus according to this invention, taken along line B—B in FIG. 4.

As shown in FIGS. 3, 4 and 5, the apparatus 4 according to the present invention comprises an end plate 10, an intermediate piece 11, a transition piece 13 closed by cover plates 12 and a flange 14 for connecting the adapter to a slot die.

All these individual parts have been conventionally assembled to form one compact block by means of screws (which are not shown, however). In the end plate 10, several melt-collecting channels 15, 16, 17, 18 are provided for receiving the polymer melts delivered by the extruders 1, 2. For the manufacture of a two-layered film having an AB structure in accordance with FIGS. 3 and 4, the melt-collecting channels 15 and 17 are connected to the extruder 1 (shown in FIG. 1) and the melt-collecting channels 16 and 18 are connected to the extruder 2 (shown in FIG. 1). The number of the melt-collecting channels 15 to 18 depends on the desired layer build-up of the film to be produced. Via a plurality of distribution bores 19, the collecting channels 15 to 18 are in connection with the substantially rectangular outlet slots 20 which are provided in the intermediate piece 11. By means of partition walls 21, which are installed in the intermediate piece 11 and preferably are interchangeable, the outlet slots 20 are subdivided into profile slots 20a, 20b, 20c, 20d. Via the collecting channels 15 to 18 and the distribution bores 19, these profile slots 20a to 20d are fed with polymer melts A and B, thus making possible the formation of two separate, two-layered polymer streams.

The basic concept underlying this invention essentially relates to the mechanical anchoring of the different layers by profiling the contact surfaces which are to be bonded to each other. On the one hand, the constructional design of the partition walls is of great importance in this connection. In the simplest version, an alternating slitting on the elements 21, as shown in FIG. 3, will suffice. Of course, the partition walls 21 can also have other profiles, such as, e.g., dovetail or saw-tooth-shaped recesses.

On the other hand, the adhesive bonding of the joined materials is largely determined by the number of toothings, which in the apparatus according to the present invention can be chosen as high as desired. This is achieved by broadening the profiles 20a to 20d in the film plane, thereby favoring production of a great number of toothed configurations, and by the multiplication of the number of profiles due to arranging them in a number of different planes which are located one above the other. It is the task of the transition piece 13, which adjoins the intermediate piece 11, to unite the multi-layered composite streams which have been formed in different planes, into one single melt stream. For this purpose, the individual composite streams are transformed so that they obtain the same cross-section as the die entry which is provided in the die flange 14. This process proceeds in the appropriately conically shaped channels 22 of the transition piece 13. In the subsequent slot die, the final flattening-down of the polymer stream, comprising several adjacent stream segments, into a homogeneous, multi-layered toothed composite film is carried out.

Apart from the already described possibility of using the apparatus for mechanically anchoring the surfaces of coextruded layers, this apparatus offers another advantage which can be of particular advantage in those cases where stretched composite films are to be manufactured from combinations of films possessing good stretching properties with films having poor stretching properties or being not stretchable at all. This advantage is illustrated by FIGS. 6 and 7 which show a three-layered coextruded composite film of an ABA structure which has been prepared by using the apparatus according to the present invention. FIG. 6 shows the film before stretching, and FIG. 7 shows it after having been stretched in the transverse direction. The film comprises two outer layers 24 and 25 of a stretchable polymeric material and an interposed layer 6 of a material which cannot be stretched at all or can be stretched only to a small degree. This interposed layer is embedded between the outer layers 24 and 25 in the form of a dense saw-tooth profile which is obtained by using appropriately shaped partition walls 21 in the apparatus according to the present invention. During the stretching process, the saw-tooth profile of the interposed layer is elongated like an accordion, and in this way is extended to the same extent as the stretched top layers. Thus, it is possible to adapt the interposed layer to the stretching conditions, by giving the profile an appropriate shape in the apparatus according to the present invention. With the aid of this apparatus, it is therefore also possible to produce stretched composite films which are composed of polymer materials possessing different stretchabilities.

The present invention provides a simple way of manufacturing multi-layered composite films wherein the layers are mechanically anchored. Due to this, the adhesion-promoting layers, which so far have been necessary, are no longer required. In contrast to other processes which necessitate the use of technically complicated and expensive special dies, this uncomplicated apparatus can be connected to any slot die desired. The constructional design of the apparatus makes it possible to obtain on the multi-layered film to be produced any desired density of toothed configurations, by which the bonding strength of the composite film is determined. This no longer depends on the dimensions of the slot die.

What is claimed is:

1. A process for producing a multiple-layered sheet of film comprising at least two thermoplastic materials by coextrusion through a generally planar wide slot die, comprising the steps of:

heat plastifying a first, second, third and fourth thermoplastic material;

joining a stream of said first heat plastified thermoplastic material and a stream of said second heat plastified thermoplastic material to form a first combined stream having a generally rectangular cross-section and having an upper layer of said first thermoplastic material and a lower layer of said second thermoplastic material mechanically anchored together by means of profiles formed on the contact surfaces of the two layers, the width of said first combined stream being greater than one-half of the width of the inlet channel of the slot die;

joining a stream of said third heat plastified thermoplastic material and a stream of said fourth heat plastified thermoplastic material to form a second combined stream having a generally rectangular cross-section and having an upper layer of said third thermoplastic material and a lower layer of said fourth thermoplastic material mechanically anchored together by means of profiles formed on the contact surfaces of the two layers, the width of said second combined stream being greater than one-half of the width of the inlet channel of the slot die;

reducing the width of said first and second combined streams;

joining said first and second combined streams in edge-to-edge fashion in a single plane to form a composite stream;

introducing said composite stream into the inlet channel of the slot die;

coextruding the composite stream through the slot die to form a generally planar multiple layer film or sheet wider than said inlet channel; and cooling the film or sheet.

2. A process as claimed in claim 1, wherein the first and second combined streams are formed in separate planes lying one above the other.

3. A process as claimed in claim 2, wherein the width of each of the first and second combined streams is greater than the width of the inlet channel of the slot die.

4. A process as claimed in claim 3, wherein the process comprises simultaneously reducing the width of said first and second composite streams and joining them to form said composite stream.

5. A process as claimed in claim 4, wherein the plane in which said first and second combined streams are joined together extends in the direction of the outlet orifice of the slot die.

6. A process as claimed in claim 5, wherein said first and second combined streams are reduced in width to a width which is sufficient to provide, in said joining step, a composite stream having a width approximately equal to the width of the inlet channel of the slot die.

7. A process as claimed in claim 1, further comprising the step of stretching the cooled film or sheet.

8. A process as claimed in claim 1 or 7, wherein said first and third thermoplastic materials are the same and said second and fourth thermoplastic materials are the same, whereby the layer build-up of said first and second combined streams is the same.

9. A process as claimed in claim 1, wherein the layer build-up of said first and second combined streams is different.

10. A process as claimed in claim 8, wherein the stretchability of said first and third thermoplastic materials is different from the stretchability of said second and fourth thermoplastic materials.

11. A process as claimed in claim 8, further comprising the steps of
- heat plastifying a fifth and sixth thermoplastic material;
- interposing a layer of said fifth thermoplastic material between said upper and lower layers when forming said first combined stream; and
- interposing a layer of said sixth thermoplastic material between said upper and lower layers when forming said second combined stream.

12. A process as claimed in claim 11, wherein the stretchability of said fifth and sixth thermoplastic materials is less than the stretchability of said first, second, third and fourth thermoplastic materials.

13. An adapter apparatus for producing a multiple-layered sheet of film comprising at least two thermoplastic materials by coextrusion through a slot die, comprising:
- an inlet member having inlet channels for first, second, third and fourth heat plastified thermoplastic materials;
- an intermediate member adjacent to said inlet member, said intermediate member having first and second generally rectangular combined-stream-forming chambers positioned one above the other, a profiled partition wall in each of said chambers dividing each chamber into first and second sub-chambers, and passageways connecting each of said sub-chambers with one of said inlet channels;
- a transition piece adjacent to said intermediate member, said transition piece having first and second channels therein, said first channel extending from said first combined-stream-forming chamber, having a convergent width and a diverging height and terminating in an outlet end, and said second channel extending from said second combined-stream-forming chamber, having a convergent width and a diverging height and terminating in an outlet end positioned side-by-side with the outlet end of said first channel; and
- a die flange connected to said transition piece for attachment of a slot extrusion die, said die flange having an aperture therein corresponding in size and shape to the inlet channel of the slot die and being positioned for communication with said outlet ends of said channels in said transition piece.

14. An adapter apparatus as claimed in claim 13, wherein each of said combined-stream-forming chambers has a plurality of said profiled partition walls positioned therein to produce a combined stream having more than two layers.

15. An adapter apparatus as claimed in claim 13 or 14, wherein said profiled partition walls are interchangeable.

16. An adapter apparatus for producing a multiple-layered sheet of film comprising at least two thermoplastic materials by coextrusion through a slot die, comprising:
- means for joining a stream of a first heat plastified thermoplastic material and a stream of a second heat plastified thermoplastic material to form a first combined stream having a generally rectangular cross-section and having an upper layer of said first thermoplastic material and a lower layer of said second thermoplastic material mechanically anchored together by means of profiles formed on the contact surfaces of the two layers, the width of said first combined stream being greater than one-half of the width of the inlet channel of the slot extrusion die;
- means for joining a stream of a third heat plastified material and a stream of a fourth heat plastified thermoplastic material to form a second combined stream having a generally rectangular cross-section and having an upper layer of said third thermoplastic material and a lower layer of said fourth thermoplastic material mechanically anchored together by means of profiles formed on the contact surfaces of the two layers, the width of said second combined stream being greater than one-half of the width of the inlet channel of the slot extrusion die;
- means for reducing the width of said first and second combined streams;
- means for joining said first and second combined streams in edge-to-edge fashion in a single plane to form a composite stream; and
- means for introducing said composite stream into the inlet channel of the slot extrusion die.

17. A co-extrusion apparatus, comprising an adapter apparatus as claimed in claim 13 and a generally planar wide slot die connected to said die flange.

* * * * *